US012665798B2

(12) United States Patent
Li et al.

(10) Patent No.: US 12,665,798 B2
(45) Date of Patent: Jun. 23, 2026

(54) DEVICES AND METHODS FOR FLEXIBLE CHANNEL MEASUREMENT USING SPLICING

(71) Applicant: Huawei Technologies Co., Ltd., Shenzhen (CN)

(72) Inventors: Yanchun Li, Wuhan (CN); Ganghua Yang, Shanghai (CN); Merouane Debbah, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 18/501,861

(22) Filed: Nov. 3, 2023

(65) Prior Publication Data

US 2024/0064051 A1     Feb. 22, 2024

Related U.S. Application Data

(63) Continuation of application No. PCT/EP2021/062095, filed on May 7, 2021.

(51) Int. Cl.
| | |
|---|---|
| *G01S 5/00* | (2006.01) |
| *G01S 5/02* | (2010.01) |
| *H04L 5/00* | (2006.01) |
| *H04L 27/26* | (2006.01) |

(52) U.S. Cl.
CPC ........ H04L 27/2613 (2013.01); H04L 5/0048 (2013.01)

(58) Field of Classification Search
CPC . H04L 27/2613; H04L 5/0048; H04B 17/318; H04B 17/391; G01S 5/0218; G01S 11/08
See application file for complete search history.

(56) References Cited

U.S. PATENT DOCUMENTS

2022/0109466 A1 *   4/2022   Manolakos ........... H04W 72/51

OTHER PUBLICATIONS

Albert Tumewu et al.: "Phase-based alignment of two signals having partially overlapped spectra", In 2009 IEEE International Conference on Acoustics, Speech and Signal Processing, Apr. 19-24, 2009, total 4 pages.

(Continued)

*Primary Examiner* — Joseph E Dean, Jr.
(74) *Attorney, Agent, or Firm* — Slater Matsil, LLP

(57) ABSTRACT

A wireless transmitter is configured to generate a first pilot signal having a first signal strength profile over a first plurality of frequency sub-bands and a second pilot signal having a second signal strength profile over a second plurality of frequency sub-bands and to transmit the first pilot signal and the second pilot signal via the communication channel to the wireless receiver. The first plurality of frequency sub-bands and the second plurality of frequency sub-bands comprise at least three common frequency sub-bands, wherein the common frequency sub-bands comprise at least one central common frequency sub-band and two boundary common frequency sub-bands, wherein a respective signal strength of the at least one central common frequency sub-band is smaller than a respective signal strength of the two boundary common frequency sub-bands.

20 Claims, 6 Drawing Sheets

500

Generating a first pilot signal having a first signal strength profile over a first plurality of frequency sub-bands and a second pilot signal having a second signal strength profile over a second plurality of frequency sub-bands — 501

Transmitting the first pilot and the second pilot signal via a communication channel to a wireless receiver, wherein the first plurality of frequency sub-bands comprises a first exclusive frequency sub-band exclusive to the first plurality of frequency sub-bands, wherein the second plurality of frequency sub-bands comprises a second exclusive frequency sub-band exclusive to the second plurality of frequency sub-bands, wherein the first plurality of frequency sub-bands and the second plurality of frequency sub-bands comprise at least three common frequency sub-bands, wherein the at least three common frequency sub-bands comprise at least one central common frequency sub-band and two boundary common frequency sub-bands, and wherein a respective signal strength of the at least one central common frequency sub-band is smaller than a respective signal strength of the two boundary common frequency sub-bands — 503

(56) References Cited

OTHER PUBLICATIONS

Armin Dammann et al.: "Optimizing Waveforms for Positioning in 5G", In 2016 IEEE 17th International Workshop on Signal Processing Advances in Wireless Communications (SPAWC), Jul. 3-6, 2016, total 5 pages.

Marco Maso et al.: "Channel Estimation Impact for LTE Small Cells based on MU-VFDM", In 2012 IEEE Wireless Communications and Networking Conference (WCNC), Jan. 8, 2013, total 7 pages.

* cited by examiner

Figure 5:
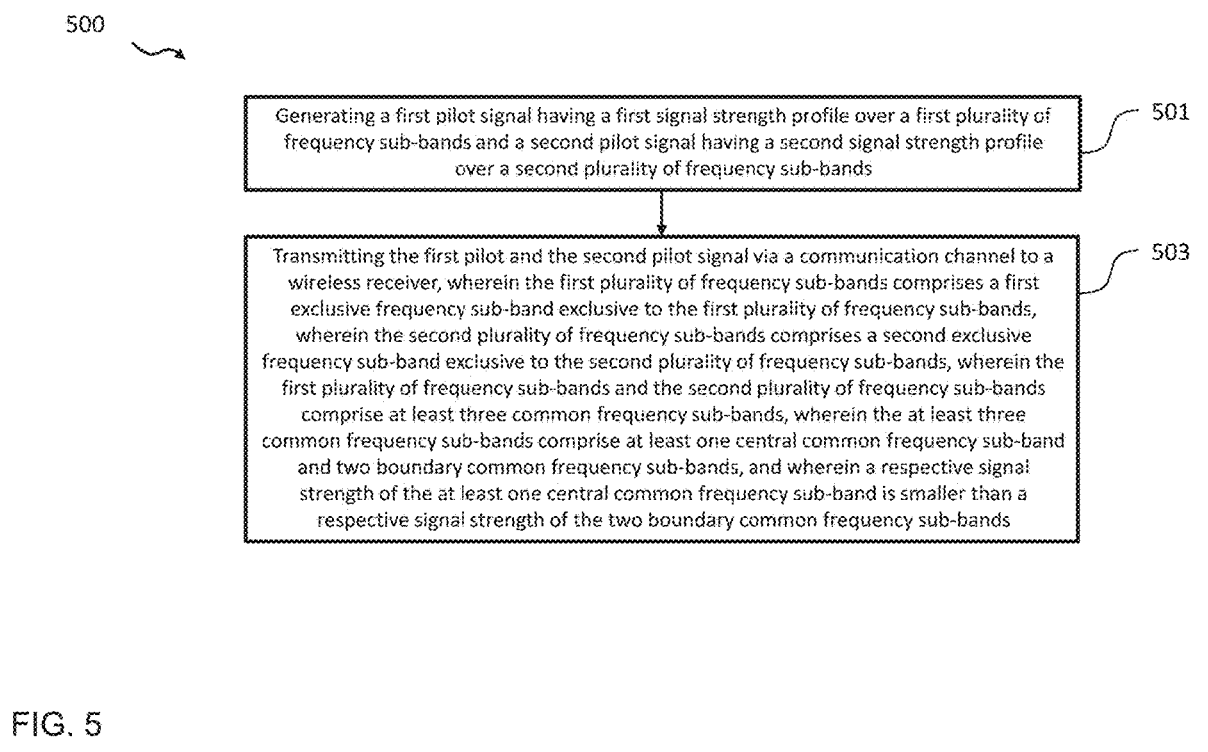

500

Generating a first pilot signal having a first signal strength profile over a first plurality of frequency sub-bands and a second pilot signal having a second signal strength profile over a second plurality of frequency sub-bands — 501

Transmitting the first pilot and the second pilot signal via a communication channel to a wireless receiver, wherein the first plurality of frequency sub-bands comprises a first exclusive frequency sub-band exclusive to the first plurality of frequency sub-bands, wherein the second plurality of frequency sub-bands comprises a second exclusive frequency sub-band exclusive to the second plurality of frequency sub-bands, wherein the first plurality of frequency sub-bands and the second plurality of frequency sub-bands comprise at least three common frequency sub-bands, wherein the at least three common frequency sub-bands comprise at least one central common frequency sub-band and two boundary common frequency sub-bands, and wherein a respective signal strength of the at least one central common frequency sub-band is smaller than a respective signal strength of the two boundary common frequency sub-bands — 503

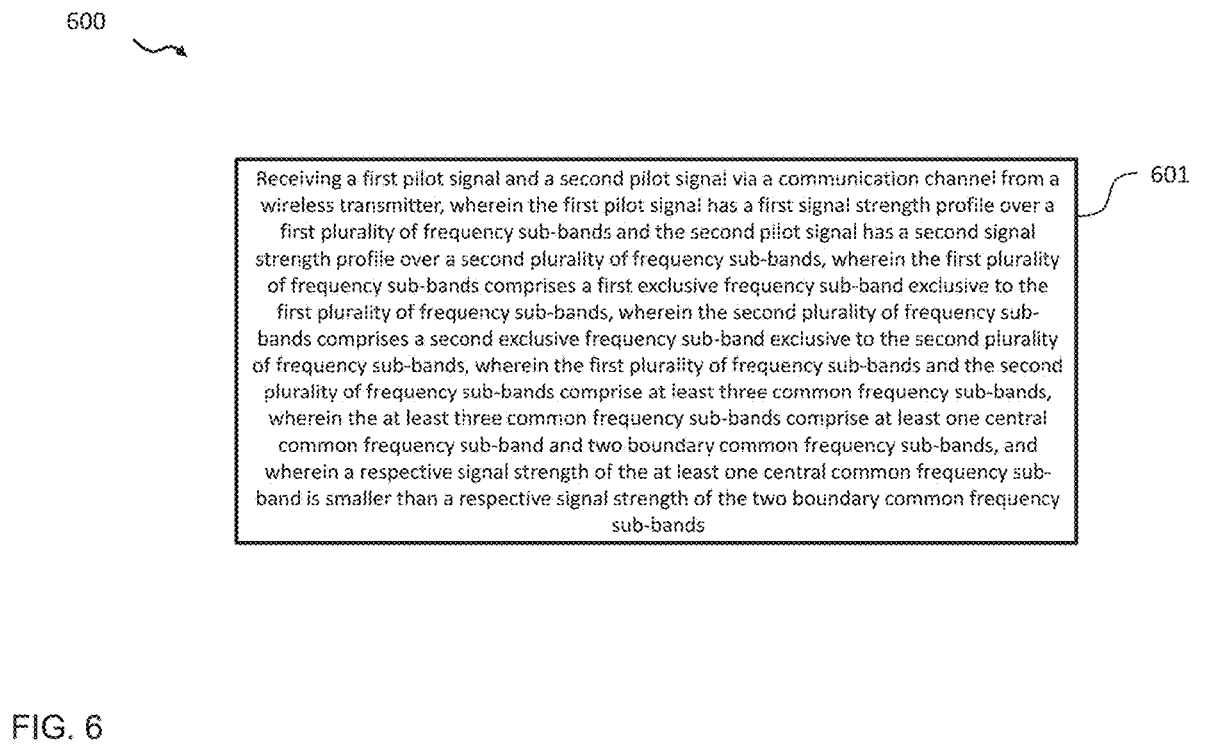

Receiving a first pilot signal and a second pilot signal via a communication channel from a wireless transmitter, wherein the first pilot signal has a first signal strength profile over a first plurality of frequency sub-bands and the second pilot signal has a second signal strength profile over a second plurality of frequency sub-bands, wherein the first plurality of frequency sub-bands comprises a first exclusive frequency sub-band exclusive to the first plurality of frequency sub-bands, wherein the second plurality of frequency sub-bands comprises a second exclusive frequency sub-band exclusive to the second plurality of frequency sub-bands, wherein the first plurality of frequency sub-bands and the second plurality of frequency sub-bands comprise at least three common frequency sub-bands, wherein the at least three common frequency sub-bands comprise at least one central common frequency sub-band and two boundary common frequency sub-bands, and wherein a respective signal strength of the at least one central common frequency sub-band is smaller than a respective signal strength of the two boundary common frequency sub-bands

FIG. 6

DEVICES AND METHODS FOR FLEXIBLE CHANNEL MEASUREMENT USING SPLICING

CROSS-REFERENCE TO RELATED APPLICATIONS

This application is a continuation of International Application No. PCT/EP2021/062095, filed on May 7, 2021, the disclosure of which is hereby incorporated by reference in its entirety.

BACKGROUND

Knowledge of the distance and/or position of a wireless communication device can be advantageously used, for instance, for improving the communication with the wireless communication device, such as in Multiple-Input Multiple-Output (MIMO) communication scenarios. Moreover, accurate ranging of a device is important for applications in a lot of different systems, such as proximity sensors, docking control, and robot collaborations. Relative ranging is usually based on the approach of obtaining the time difference of arrival, between two communication paths, e.g. between a direct communication path and an indirect communication path involving one or more reflections. Theoretical results show that the absolute or relative ranging accuracy is proportional to the system bandwidth. However, a communication system with a large bandwidth is usually very costly with respect to the computational and power resources, for instance, because of the wideband RF costs and wideband (high sampling rate) ADC/DAC costs.

FIG. 1 illustrates a known approach for using a limited bandwidth for estimating a channel state by performing narrow band channel measurement over multiple frequency bands, and then splicing, i.e. combining the results. For the example of two frequency bands shown in FIG. 1, an effective channel can be estimated in the following way. In a first stage, the frequency responses of the channel over the first band (referred to as "band 1" in FIG. 1) and over the second band (referred to as "band 2" in FIG. 2) are measured. In a further stage, these measurements are combined, i.e. spliced, and the channel state is estimated. More specifically, assuming that the channel response is smooth in the frequency domain, the same channel responses are expected to be identical for the two measurements within the overlapped portion of the two frequency bands, the two measurements can be combined, i.e. spliced. In doing so, a channel response over the full frequency band, i.e. covering both bands, may be obtained.

SUMMARY

It is an objective of the embodiments to provide improved communication devices and methods for flexible channel state measurement using splicing. There is a need for such a channel state measurement scheme, because the size of the resulting effective frequency band affects, for instance, a ranging resolution (i.e. the larger the frequency band the better the ranging resolution).

The foregoing and other objectives are achieved by the subject matter of the independent claims. Further implementation forms are apparent from the dependent claims, the description and the figures.

Embodiments disclosed herein provide a flexible channel state measurement scheme making use of frequency band splicing, i.e. combining the channel state information obtained in different, but partially overlapping frequency bands.

According to a first aspect, a wireless transmitter is provided. The wireless transmitter comprises a processing entity configured to generate a first pilot signal having a first signal strength profile, i.e. spectrum over a first plurality of frequency sub-bands and a second pilot signal having a second signal strength profile, i.e. spectrum over a second plurality of frequency sub-bands. The wireless transmitter further comprises a communication interface configured to transmit the first pilot signal and the second pilot signal via a communication channel to a wireless receiver. The first plurality of frequency sub-bands comprises a first exclusive frequency sub-band exclusive to the first plurality of frequency sub-bands and the second plurality of frequency sub-bands comprises a second exclusive frequency sub-band exclusive to the first plurality of frequency sub-bands. Moreover, the first plurality of frequency sub-bands and the second plurality of frequency sub-bands comprises at least three common frequency sub-bands, i.e. at least three frequency sub-bands covered by both the first pilot signal and the second pilot signal.

The at least three common frequency sub-bands comprise at least one central common frequency sub-band and two boundary common frequency sub-bands, wherein a respective signal strength, e.g. an average signal strength of the at least one central common frequency sub-band is smaller than a respective signal strength, e.g. a respective average signal strength of the two boundary common frequency sub-bands.

In a further possible implementation form of the first aspect, a respective signal strength, e.g. a respective average signal strength of the first and/or second exclusive frequency sub-band is larger than the respective signal strength, e.g. a respective average signal strength of the at least three common frequency sub-bands.

In a further possible implementation form of the first aspect, the communication interface is configured to transmit the first pilot signal and the second pilot signal substantially simultaneously via the communication channel to the wireless receiver.

In a further possible implementation form of the first aspect, the communication interface is configured to transmit the second pilot signal after the first pilot signal via the communication channel to the wireless receiver.

In a further possible implementation form of the first aspect, a respective signal strength, e.g. signal energy or signal power of the first pilot signal and a respective signal strength, e.g. signal energy or signal power of the second pilot signal is substantially constant within each of the at least three common frequency sub-bands.

In a further possible implementation form of the first aspect, the first pilot signal comprises a first signal phase profile, i.e. phase dependence over the first plurality of frequency sub-bands and the second pilot signal comprises a second signal phase profile, i.e. phase dependence over the second plurality of frequency sub-bands.

In a further possible implementation form of the first aspect, each of the at least three common frequency sub-bands comprises one or more frequency subcarriers.

In a further possible implementation form of the first aspect, the processing entity is configured to generate the first pilot signal based on a first code sequence and the second pilot signal based on a second code sequence.

In a further possible implementation form of the first aspect, at least one of the first code sequence and the second code sequence is pre-coded in the spatial domain or the frequency domain.

In a further possible implementation form of the first aspect, the processing entity is further configured to scramble, e.g. encrypt at least one of the first code sequence and the second code sequence using a cryptographic key.

In a further possible implementation form of the first aspect, the communication interface is further configured to send information about the first signal strength profile and/or the second signal strength profile to the wireless receiver.

According to a second aspect, a wireless transmission method is provided. The wireless transmission method comprises the steps of: generating a first pilot signal having a first signal strength profile, i.e. spectrum over a first plurality of frequency sub-bands and a second pilot signal having a second signal strength profile, i.e. spectrum over a second plurality of frequency sub-bands; and transmitting the first pilot signal and the second pilot signal via a communication channel to a wireless receiver, wherein the first plurality of frequency sub-bands comprises a first exclusive frequency sub-band exclusive to the first plurality of frequency sub-bands, wherein the second plurality of frequency sub-bands comprises a second exclusive frequency sub-band exclusive to the first plurality of frequency sub-bands, wherein the first plurality of frequency sub-bands and the second plurality of frequency sub-bands comprise at least three common frequency sub-bands, wherein the at least three common frequency sub-bands comprise at least one central common frequency sub-band and two boundary common frequency sub-bands, and wherein a respective signal strength, e.g. an average signal strength of the at least one central common frequency sub-band is smaller than a respective signal strength, e.g. a respective average signal strength of the two boundary common frequency sub-bands.

According to a third aspect, a wireless receiver is provided. The wireless receiver comprises a communication interface configured to receive a first pilot signal and a second pilot signal via a communication channel from a wireless transmitter. The first pilot signal has a first signal strength profile, i.e. spectrum over a first plurality of frequency sub-bands and the second pilot signal has a second signal strength profile, i.e. spectrum over a second plurality of frequency sub-bands. The first plurality of frequency sub-bands comprises a first exclusive frequency sub-band exclusive to the first plurality of frequency sub-bands. The second plurality of frequency sub-bands comprises a second exclusive frequency sub-band exclusive to the second plurality of frequency sub-bands. The first plurality of frequency sub-bands and the second plurality of frequency sub-bands comprise at least three common frequency sub-bands, wherein the at least three common frequency sub-bands comprise at least one central common frequency sub-band and two boundary common frequency sub-bands. A respective signal strength, e.g. an average signal strength of the at least one central common frequency sub-band is smaller than a respective signal strength, e.g. an average signal strength of the two boundary common frequency sub-bands.

In a further possible implementation form of the third aspect, a respective signal strength, e.g. an average signal strength of the first and/or second exclusive frequency sub-band is larger than the respective signal strength, e.g. an average signal strength of the at least three common frequency sub-bands.

In a further possible implementation form of the third aspect, the communication interface is configured to receive the first pilot signal and the second pilot signal substantially simultaneously via the communication channel from the wireless transmitter.

In a further possible implementation form of the third aspect, the communication interface is configured to receive the second pilot signal after the first pilot signal via the communication channel from the wireless transmitter.

In a further possible implementation form of the third aspect, a respective signal strength, e.g. signal energy or signal power of the first pilot signal and a respective signal strength, e.g. signal energy or signal power of the second pilot signal is substantially constant within each of the at least three common frequency sub-bands.

In a further possible implementation form of the third aspect, the first pilot signal comprises a first signal phase profile, i.e. phase dependency over the first plurality of frequency sub-bands and the second pilot signal comprises a second signal phase profile, i.e. phase dependency over the second plurality of frequency sub-bands.

In a further possible implementation form of the third aspect, each of the at least three common frequency sub-bands comprises one or more frequency subcarriers.

In a further possible implementation form of the third aspect, the first pilot signal is based on a first code sequence and the second pilot signal is based on a second code sequence.

In a further possible implementation form of the third aspect, at least one of the first code sequence and the second code sequence is pre-coded in the spatial domain or the frequency domain.

In a further possible implementation form of the third aspect, the wireless receiver comprises a processing entity configured to descramble at least one of the first code sequence and the second code sequence using a cryptographic key.

In a further possible implementation form of the third aspect, the communication interface is further configured to receive information about the first signal strength profile and/or the second signal strength profile from the wireless transmitter.

In a further possible implementation form of the third aspect, the wireless receiver further comprises a processing entity configured to combine information of the first exclusive frequency sub-band exclusive to the first plurality of frequency sub-bands and information of the second exclusive frequency sub-band exclusive to the second plurality of frequency sub-bands based on the at least three common frequency sub-bands.

According to a fourth aspect, a wireless reception method is provided. The wireless reception method comprises the step of: receiving a first pilot signal and a second pilot signal via a communication channel from a wireless transmitter, wherein the first pilot signal has a first signal strength profile, i.e. spectrum over a first plurality of frequency sub-bands and the second pilot signal has a second signal strength profile, i.e. spectrum over a second plurality of frequency sub-bands, wherein the first plurality of frequency sub-bands comprises a first exclusive frequency sub-band exclusive to the first plurality of frequency sub-bands, wherein the second plurality of frequency sub-bands comprises a second exclusive frequency sub-band exclusive to the second plurality of frequency sub-bands, wherein the first plurality of frequency sub-bands and the second plurality of frequency sub-bands comprise at least three common frequency sub-bands, wherein the at least three common frequency sub-bands, wherein the at least three common frequency sub-bands comprise at least one central common frequency sub-band and two boundary common frequency sub-bands, and wherein a respective signal strength, e.g. an average signal strength of the at least one central common frequency sub-band is smaller than a respective signal strength, e.g. an average signal strength of the two boundary common frequency sub-bands.

According to a fifth aspect, a computer program product is provided, comprising a computer-readable storage medium for storing program code which causes a computer or a processor to perform the method according to the second aspect or the method according to the fourth aspect when the program code is executed by the computer or the processor.

The different aspects of the embodiments described herein can be implemented in software and/or hardware.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments are described in more detail with reference to the attached figures and drawings, in which:

FIG. 5 is a flow diagram illustrating steps of a wireless transmission method according to an embodiment; and FIG. 6 is a flow diagram illustrating steps of a wireless reception method according to an embodiment.

In the following, identical reference signs refer to identical or at least functionally equivalent features.

DETAILED DESCRIPTION OF ILLUSTRATIVE EMBODIMENTS

In the following description, reference is made to the accompanying figures, which form part of the disclosure, and which show, by way of illustration, specific aspects of embodiments or specific aspects in which embodiments may be used. It is understood that embodiments may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
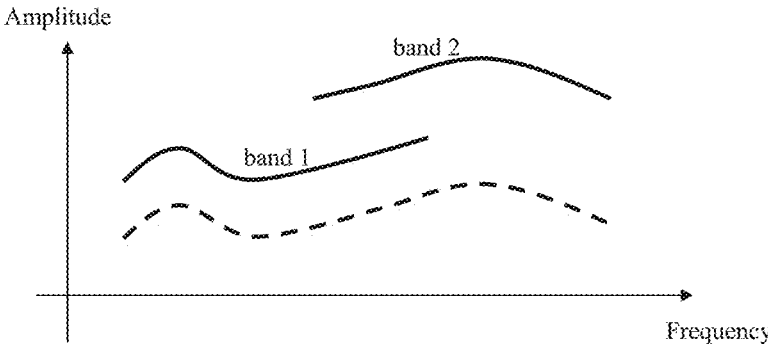
FIG. 1 is a schematic diagram illustrating a conventional approach for using a limited bandwidth for estimating a channel state by performing narrow band channel measurement over multiple frequency bands.
Figure 2:
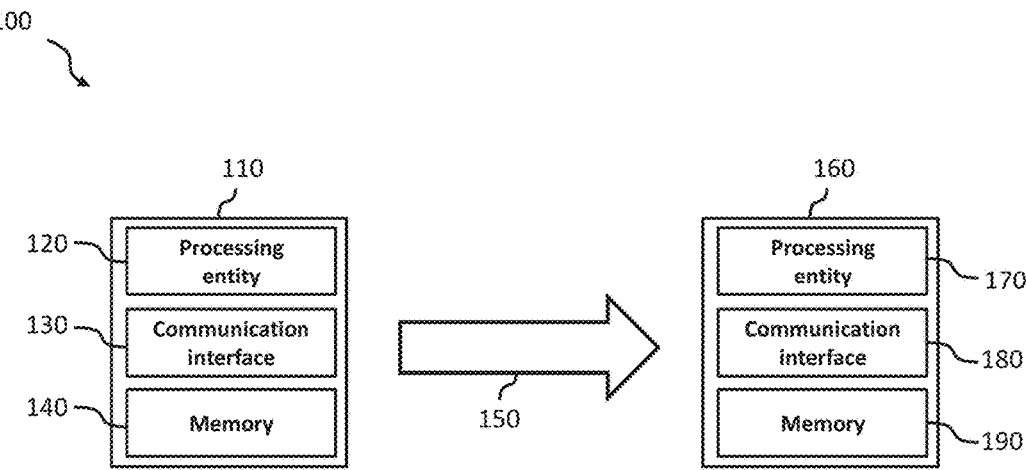
FIG. 2 is a schematic diagram illustrating a wireless communication system, including a wireless transmitter according to an embodiment communicating with a wireless receiver according to an embodiment.

FIG. 2 is a schematic diagram illustrating a communication system 100 including a wireless transmitter 110 according to an embodiment configured to communicate with a wireless receiver 160 according to an embodiment via a wireless communication channel 150 (also referred to as communication link 150).

As illustrated in FIG. 2, the wireless transmitter 110 comprises a processing entity, for instance, a processor 120 for processing data and a communication interface 130 for transmitting and receiving data via the communication channel 150. In an embodiment, the communication interface 130 may comprise one or more antennas for wireless communication. The processing entity 120 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The wireless transmitter 110 may further comprise a memory 140, e.g. a Flash memory 140, configured to store executable program code which, when executed by the processing entity 120, causes the wireless transmitter 110 to perform the functions and operations described herein.

Likewise, the wireless receiver 160 comprises a processing entity, e.g. a processor 170 for processing data and a communication interface 180 for receiving and transmitting data via the communication channel 150. In an embodiment, the communication interface 180 may comprise one or more antennas for wireless communication. The processing entity 170 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The receiver apparatus 160 may further comprise a memory 190, e.g. a Flash memory 190, configured to store executable program code which, when executed by the processing entity 170, causes the wireless receiver 160 to perform the functions and operations described herein.

Figure 3:
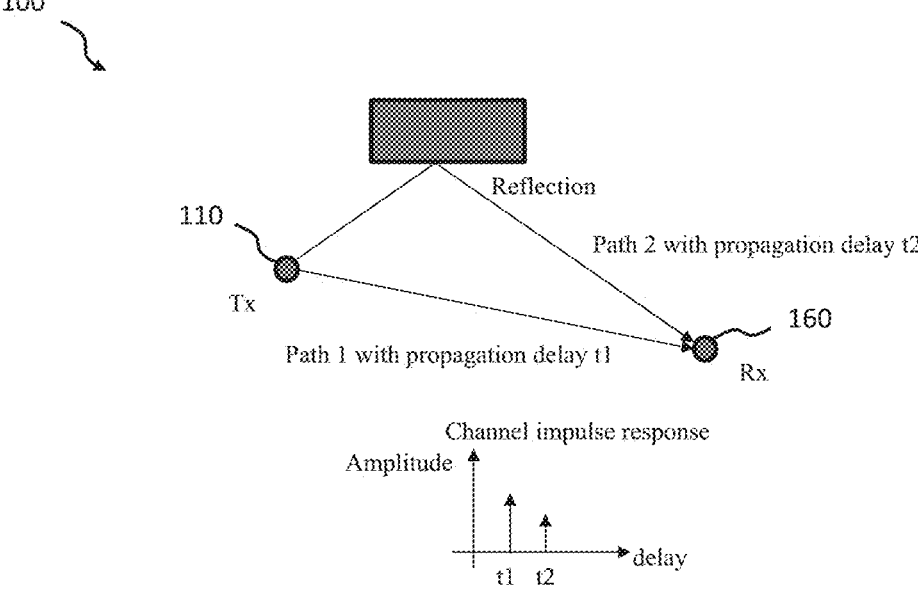
FIG. 3 is a schematic diagram illustrating the wireless communication system of FIG. 2 in a communication scenario including a reflected communication path.

As will be described in more detail below, further referring to FIGS. 3 and 4, embodiments of the wireless transmitter 110 and the wireless receiver 160 disclosed herein provide a flexible channel state measurement scheme making use of frequency band splicing, i.e. combining the channel state information obtained in different, but partially overlapping frequency bands.

More specifically, the processing entity 120 of the wireless transmitter 110 is configured to generate a first pilot signal and a second pilot signal. The communication interface 130 of the wireless transmitter 110 is configured to transmit the first pilot signal and the second pilot signal via the communication channel 150 to the wireless receiver 160. The communication interface 180 of the wireless receiver 160 is configured to receive the first and second pilot signal transmitted via the communication channel 150. As illustrated in FIG. 3, the communication channel 150 may include a direct path and one or more reflections and the channel impulse responses measured by the wireless receiver 160 may exhibit one or more time delays.

Figure 4:
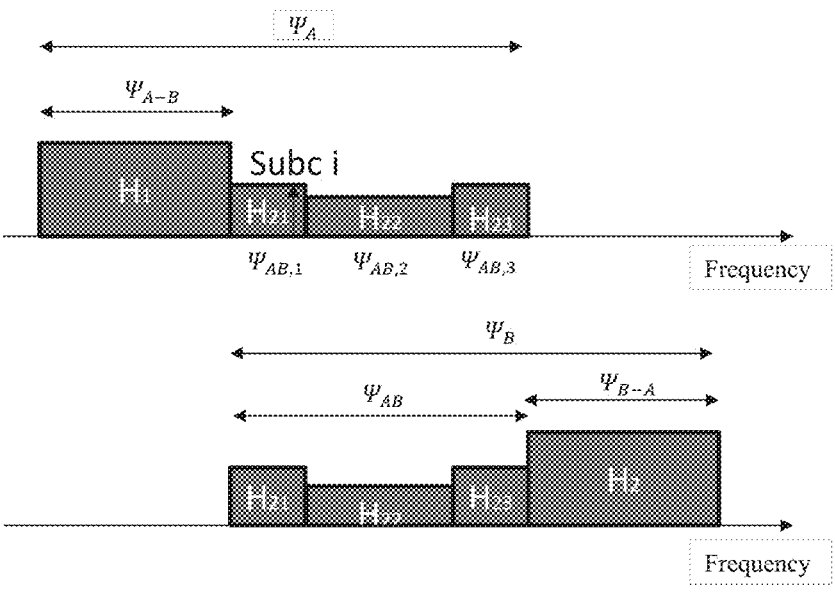
FIG. 4 is a schematic diagram illustrating a plurality of frequency sub-bands of a first pilot signal and a plurality of frequency sub-bands of a second pilot signal used by a wireless transmitter according to an embodiment and a wireless receiver according to an embodiment.

FIG. 4 illustrates an embodiment of a flexible channel state measurement scheme implemented by the wireless transmitter 110 and the wireless receiver 160 making use of frequency band splicing, i.e. combining the channel state information obtained in different, but partially overlapping frequency bands. In the embodiment of FIG. 4 the wireless transmitter 110 is configured to transmit a first pilot or sounding signal (also referred to as ranging signal) extending in the frequency domain over a first frequency band $\Psi_A$ and a second pilot or sounding signal extending over a second frequency band $\Psi_B$ towards the wireless receiver 160. As illustrated in FIG. 4, in the frequency domain the first pilot signal and the second pilot signal overlap in a common frequency band $\Psi_{AB}$. Conventionally, it would only be possible to use (i.e. combine) the channel state information within the common frequency band $\Psi_{AB}$. However, as will be described in more detail below, embodiments disclosed herein allow to extend this band to the non-overlapping (i.e. exclusive) portions of the frequency bands $\Psi_A$ and $\Psi_B$, thereby making it possible to combine the channel state information in the frequency bands $\Psi_A$ and $\Psi_B$, for instance, for an improved ranging/localization operation between the wireless transmitter 110 and the wireless receiver 160.

As illustrated in FIG. 4, the first pilot signal has a first signal strength profile, i.e. spectrum over a first plurality of frequency sub-bands H1, H21, H22, H23 and the second pilot signal has a second signal strength profile over a second plurality of frequency sub-bands H21, H22, H23, H2. The first plurality of frequency sub-bands H1, H21, H22, H23 comprises a first exclusive frequency sub-band H1 exclusive to the first plurality of frequency sub-bands H1, H21, H22, H23, i.e. not overlapping with the second plurality of frequency sub-bands H21, H22, H23, H2. Likewise, the second plurality of frequency sub-bands H21, H22, H23, H2 comprises a second exclusive frequency sub-band H2 exclusive to the second plurality of frequency sub-bands H21, H22, H23, H2, i.e. not overlapping with the first plurality of frequency sub-bands H1, H21, H22, H23.

As further illustrated in FIG. 4, the first plurality of frequency sub-bands H1, H21, H22, H23 and the second plurality of frequency sub-bands H21, H22, H23, H2 comprise at least three common frequency sub-bands H21, H22, H23, wherein the at least three common frequency sub-bands H21, H22, H23 comprise at least one central common frequency sub-band H22 and two boundary common frequency sub-bands H21, H23. The wireless transmitter 110 is configured to select the signal strength of the at least one central common frequency sub-band H22 to be smaller than a respective signal strength of the two boundary common frequency sub-bands H21, H23.

In an embodiment, the first pilot signal and the second pilot signal may be pre-specified by their code sequence and/or signal strength, in particular amplitude or power within the common frequency band $\Psi_{AB}$. In an embodiment, the signal strength may be an absolute power level or a relative power level between the common frequency sub-band(s) and the exclusive frequency sub-bands. Each common frequency sub-band may comprise one or more sub-carriers. The amplitude/power and/or sub-carrier pattern in each sub-band may be specified or indicated by the wireless transmitter 110 or the wireless receiver 160.

In an embodiment, the communication interface 120 of the wireless transmitter 110 may be configured to transmit the first sounding signal and the second sounding signal (and possibly further sounding signals) sequentially or essentially parallel in time.

As already described above, in the example shown in FIG. 4, the first pilot signal emitted by the wireless transmitter 110 may cover a first frequency band $\Psi_A$. On the basis of the first pilot signal the wireless receiver 160 may measure, i.e. determine first channel state information (CSI), i.e. the response of the communication channel 150 to the first pilot signal over the first frequency band $\Psi_A$. The second pilot signal covers the second frequency band $\Psi_B$. $\Psi_{A-B}$ denotes the frequency band covered by the first pilot signal but not the second pilot signal. $\Psi_{B-A}$ denotes the frequency band covered by the second pilot signal, but not the first pilot signal.

In an embodiment, the quasi-overlap frequency carrier set $\Psi_{AB}$ can be the set of common frequency carriers in $\Psi_A$ and $\Psi_B$. In a further embodiment, the quasi-overlap frequency carrier set $\Psi_{AB}$ can be the frequency carrier in $\Psi_A$ that has less than $\Delta f$ seperation from at least one of frequency carriers in $\Psi_B$. The quasi-overlap frequency carrier set $\Psi_{AB}$ can have one or more subsets. $\Psi_{AB,1}$, $\Psi_{AB,2}$, $\Psi_{AB,3}$.

As illustrated in FIG. 4, in an embodiment, the first pilot signal transmitted over $\Psi_{AB,n}$ in measurement A may be represented as $$s_{AB,i}^{(A)} \in \mathbb{C}^{1 \times |\psi_{AB}|}.$$

The second pilot signal transmitted over $\Psi_{AB,n}$ in measurement B may be represented as $$s_{AB,n}^{(B)} \in \mathbb{C}^{1 \times |\psi_{AB}|}.$$

The power corresponding to $$s_{AB,n}^{(B)}$$

on subcarrier is $$p_{AB,n}^{(A)}.$$

At least for a subset, $$p_{AB,n-offset1}^{(A)} > p_{AB,n}^{(A)},$$

$$p_{AB,n+offset2}^{(B)} > p_{AB,n}^{(B)},$$

where offset1>0, offset2>0.

For the measurement of the first pilot signal by the wireless receiver 160 (i.e. measurement A) due to imperfect synchronization in time $t_A$ and phase $\phi_A$, the effective channel may be rotated by some phase shifts;

$$\hat{h}_i^{(A)} = h_i e^{j(\Delta f i \Delta t_A + \phi_A)}, i \in \Psi_A \hat{h}_i^{(B)} = h_i e^{j(\Delta f i \Delta t_B + \phi_B)}, i \in \Psi_B$$

The transmitted signal passes through this effective channel, so the received signal may be expressed as $$\hat{h}_i^{(A)} s_{AB,i}^{(A)}.$$

In an embodiment, $$s_{AB,i}^{(A)}, s_{AB,n}^{(B)}$$

may be predetermined by protocols. Since the wireless receiver 160 knows the first and second pilot signal $$s_{AB,i}^{(A)} \text{ and } s_{AB,n}^{(B)},$$

the wireless receiver 160 may obtain $$\hat{h}_i^{(A)}, \hat{h}_i^{(B)}.$$

By unwrapping the phases over subcarriers, and comparing them between measurement A (i.e. the first pilot signal) and B (i.e. the second pilot signal), the processing entity 170 of the wireless receiver 160 may estimate $\Delta t_A$-$\Delta t_B$ (i.e. the time delay differences) and $\phi_A$-$\phi_B$ (i.e. the phase differences). In an embodiment, the processing entity 170 of the wireless receiver 160 may be configured to generate these estimates based on a slope and an offset of the dependency of the unwrapped phases on frequency. The sub-bands or subcarriers close to $\Psi_{A-B}$ and $\Psi_{B-A}$, e.g. the sub-bands H21 and H23 are very important, since they are very sensitive to $\Delta t_A$-$\Delta t_B$ and $\phi_A$-$\phi_B$.

The sub-band(s) or subcarrier(s) in the middle of frequency bands $\Psi_{A-B}$ and $\Psi_{B-A}$, e.g. the sub-band H22, may be used for avoiding ambiguity in the unwrapping process described above. In an embodiment, the wireless receiver 160 may compensate the delay and phase offset difference in the measurement B (i.e. the second pilot signal), so that it can be aligned with the measurement A (i.e. the first pilot signal), as described by the following equation:

$$\hat{h}_i^{(B \to A)} = \hat{h}_i^{(B)} e^{j(\Delta f i (\Delta t_A - \Delta t_B) + (\phi_A - \phi_B))}$$

So, by using the channel coefficients in $$\hat{h}_i^{(A)}, i \in \Psi_A \text{ and } \hat{h}_i^{(B \to A)}, i \in \Psi_B,$$

the processing entity 170 of the wireless receiver 160 may obtain the channel frequency response over $\Psi_A \cup \Psi_B$, which is equivalent to a wider band measurement (than both $\Psi_A$ and $\Psi_B$).

The embodiments described above may be employed for ranging applications by estimating the relative or absolute delay of each channel path, sub-path or tap. For instance, Line-of-Sight (LoS) ranging may be identified and used for estimating the distance between the wireless transmitter 110 and the receiver 160, while one or more non-LoS (NLoS) ranging estimates are used for the NLoS path recovery and virtual anchor inference. Advantageously, embodiments disclosed herein allow to provide the extended frequency bands necessary for such ranging applications.

As will be appreciated, the channel coefficients in the exclusive frequency sub-bands H1 and H2 shown in FIG. 4 are most sensitive to the delays and contribute most to the estimation of the LoS/NLoS delays. However, in multiple (2 or more) pilot transmissions, the received signals may be corrupted by the delay misalignment. Thus, the common frequency sub-bands H21, H22, H23 allow to align two or more received pilot signals to a common time offset, based on, for instance, the relative delay $\Delta t_A$-$\Delta t_B$. The channel response over the exclusive frequency sub-bands H1 and H2 may be aligned accordingly, since the exclusive frequency and common frequency sub-bands in a pilot transmission have exact the same delay. For instance, for the measurement A, $\Psi_A$ covers $\Psi_{A-B}$ and $\Psi_{AB}$, so measurements on $\Psi_{A-B}$ and $\Psi_{AB}$ have the same delay.

As will be further appreciated, since the common frequency sub-bands H21, H22, H23 are used for the estimation of the delay (when it is a complex value, it may also take account of the phase shift), the common frequency sub-bands H21, H22, H23 are selected in an embodiment for the purpose of allowing a good estimation of the (relative) delay. As already described above, this may be achieved by allocating more power to the common frequency sub-bands H21 and H23 so that these common parts are more sensitive to this (relative) delay, and better for delay estimation. Thus, the overall signal (including both the exclusive and common frequency sub-bands) may enable improved ranging applications.

Thus, in an embodiment, the common frequency sub-bands H21, H22, H23 are used for alignment, while exclusive frequency sub-bands H1, H2 are used for LoS/NLoS parameter (including delay) estimation. In an embodiment, these estimates can be done iteratively and their data can be combined.

In an embodiment, the first and second pilot signal, e.g.

$$s_{AB,i}^{(A)}, s_{AB,n}^{(B)}$$

can be predetermined by protocols implemented by the wireless transmitter 110 and the wireless receiver 160 and at least one additional variable. In an embodiment, the at least one additional variable may depend on a random seed number used by the wireless transmitter 110. In an embodiment, information about this random seed number may be transmitted from the wireless transmitter 110 to the wireless receiver 160 prior, during or after the transmission of the first and/or second pilot signal. In such an embodiment, a third party receiving the first and second pilot signals is not capable of advantageously combining the information thereof as disclosed herein without knowledge of the random seed number.

In an embodiment, the power corresponding to $$s_{AB,n}^{(B)}$$

on subcarrier is $$p_{AB,n}''^{(A)}.$$

Since the subcarrier in the middle of the common frequency band $\Psi_{AB}$ may be used to avoid $2\pi$ ambiguity (as described above), a sparse sampling of subcarriers within the sub-bands may be implemented, so that adjacent sampled subcarriers (subcarrier physical power is non-zero) may have a phase shift not greater than or equal to $\pi$. In an embodiment, the effective power corresponding to $$s_{AB,n}^{(B)}$$

on subcarrier is $$p_{AB,n}'^{(A)}$$

and may be determined by sampling the subcarrier spacing. For instance, in an embodiment, the first and second pilot signal $$s_{AB,n}^{(B)}$$

may occupy 1 subcarrier over K consecutive subcarriers, so that $$p_{AB,n}'^{(A)} = p_{AB,n}''^{(A)} / K.$$

Since more effective power can be allocated to the subcarrier in $\Psi_{A-B}$, and $\Psi_{B-A}$, the channels, which are more relevant to delay or phase difference estimation, may lead to better localization accuracy.

In a further embodiment, the first and/or second pilot signal, i.e.

$$s_{AB,i}^{(X)}, X = A \text{ or } B$$

can be pre-coded in the frequency/spatial domain by the wireless transmitter 110, so as to minimize the impact of the pilot signal on a further concurrent wireless transmission.

In an embodiment, the common frequency sub-bands may have more than one subcarriers, so that the measurement within this set has frequency diversity.

FIG. 5 shows a flow diagram illustrating steps of a wireless transmission method 500 for communication via the communication channel 150. The wireless transmission method 500 comprises a first step 501 of generating the first pilot signal having a first signal strength profile over the first plurality of frequency sub-bands H1, H21, H22, H23 and the second pilot signal having a second signal strength profile over the second plurality of frequency sub-bands H21, H22, H23, H2. Moreover, the method 500 comprises the step 503 of transmitting the first pilot signal and the second pilot signal via the communication channel to the wireless receiver 160. As already described above, the first plurality of frequency sub-bands H1, H21, H22, H23 comprises the first exclusive frequency sub-band H1 exclusive to the first plurality of frequency sub-bands H1, H21, H22, H23. The second plurality of frequency sub-bands H21, H22, H23, H2 comprises the second exclusive frequency sub-band H2 exclusive to the second plurality of frequency sub-bands H21, H22, H23, H2. The first plurality of frequency sub-bands H1, H21, H22, H23 and the second plurality of frequency sub-bands H21, H22, H23, H2 comprise at least three common frequency sub-bands H21, H22, H23, wherein the at least three common frequency sub-bands H21, H22, H23 comprise at least one central common frequency sub-band H22 and two boundary common frequency sub-bands H21, H23. A respective signal strength of the at least one central common frequency sub-band H22 is smaller than a respective signal strength of the two boundary common frequency sub-bands H21, H23.

FIG. 6 shows a flow diagram illustrating steps of a wireless reception method 600 for communication via the communication channel 150. The wireless reception method 600 comprises the step 601 of receiving the first pilot signal and the second pilot signal via the communication channel 150 from the wireless transmitter 110. As already described above, the first pilot signal has a first signal strength profile over the first plurality of frequency sub-bands H1, H21, H22, H23 and the second pilot signal has a second signal strength profile over the second plurality of frequency sub-bands H21, H22, H23, H2. The first plurality of frequency sub-bands H1, H21, H22, H23 comprises a first exclusive frequency sub-band H1 exclusive to the first plurality of frequency sub-bands H1, H21, H22, H23. The second plurality of frequency sub-bands H21, H22, H23, H2 comprises a second exclusive frequency sub-band H2 exclusive to the second plurality of frequency sub-bands H21, H22, H23, H2. The first plurality of frequency sub-bands H1, H21, H22, H23 and the second plurality of frequency sub-bands H21, H22, H23, H2 comprise at least three common frequency sub-bands H21, H22, H23, wherein the at least three common frequency sub-bands H21, H22, H23 comprise at least one central common frequency sub-band H22 and two boundary common frequency sub-bands H21, H23. A respective signal strength of the at least one central common frequency sub-band H22 is smaller than a respective signal strength of the two boundary common frequency sub-bands H21, H23.

The person skilled in the art will understand that the "blocks" ("units") of the various figures (method and apparatus) represent or describe functionalities of embodiments described herein (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments described herein may be integrated into one processing unit, or each of the units may exist alone physically, or two or more units are integrated into one unit.

What is claimed is:

1. A wireless transmitter, comprising:

at least one processor, configured to generate a first pilot signal having a first signal strength profile over a first plurality of adjacent frequency sub-bands and a second pilot signal having a second signal strength profile over a second plurality of adjacent frequency sub-bands; and a communication interface, configured to transmit the first pilot signal and the second pilot signal via a communication channel to a wireless receiver, wherein the first plurality of adjacent frequency sub-bands comprises a first exclusive frequency sub-band that is not comprised in the second plurality of adjacent frequency sub-bands, wherein the second plurality of adjacent frequency sub-bands comprises a second exclusive frequency sub-band that is not comprised in the first plurality of adjacent frequency sub-bands, wherein the first plurality of adjacent frequency sub-bands and the second plurality of adjacent frequency sub-bands comprise at least three common frequency sub-bands, wherein the at least three common frequency sub-bands comprise at least one central common frequency sub-band and two boundary common frequency sub-bands, a first boundary common frequency sub-band of the two boundary common frequency sub-bands is at a lower frequency side of and adjacent to the central common frequency sub-band, and a second boundary common frequency sub-band of the two boundary common frequency sub-bands is at a higher frequency side of and adjacent to the central common frequency sub-band, and wherein in each of the first signal strength profile and the second signal strength profile a respective signal strength of the at least one central common frequency sub-band is smaller than a respective signal strength of each of the two boundary common frequency sub-bands.

2. The wireless transmitter of claim 1, wherein in each of the first signal strength profile and the second signal strength profile a respective signal strength of the first exclusive frequency sub-band or the second exclusive frequency sub-band is larger than a respective signal strength of each of the at least three common frequency sub-bands.

3. The wireless transmitter of claim 1, wherein the communication interface is configured to transmit the first pilot signal and the second pilot signal simultaneously via the communication channel to the wireless receiver.

4. The wireless transmitter of claim 1, wherein the communication interface is configured to transmit the second pilot signal after the first pilot signal via the communication channel to the wireless receiver.

5. The wireless transmitter of claim 1, wherein a respective signal strength of the first pilot signal and a respective signal strength of the second pilot signal is constant within each of the at least three common frequency sub-bands.

6. The wireless transmitter of claim 1, wherein the first pilot signal comprises a first signal phase profile over the first plurality of adjacent frequency sub-bands and the second pilot signal comprises a second signal phase profile over the second plurality of adjacent frequency sub-bands.

7. The wireless transmitter of claim 1, wherein each of the at least three common frequency sub-bands comprises one or more subcarriers.

8. The wireless transmitter of claim 1, wherein the at least one processor is configured to generate the first pilot signal based on a first code sequence and the second pilot signal based on a second code sequence.

9. The wireless transmitter of claim 8, wherein at least one of the first code sequence or the second code sequence is pre-coded in a spatial domain or a frequency domain.

10. The wireless transmitter of claim 8, wherein the at least one processor is further configured to scramble at least one of the first code sequence or the second code sequence using a cryptographic key.

11. The wireless transmitter of claim 1, wherein the communication interface is further configured to send information about the first signal strength profile or the second signal strength profile to the wireless receiver.

12. A method, comprising:

generating a first pilot signal having a first signal strength profile over a first plurality of adjacent frequency sub-bands and a second pilot signal having a second signal strength profile over a second plurality of adjacent frequency sub-bands; and transmitting the first pilot signal and the second pilot signal via a communication channel to a wireless receiver, wherein the first plurality of adjacent frequency sub-bands comprises a first exclusive frequency sub-band that is not comprised in the second plurality of adjacent frequency sub-bands, wherein the second plurality of adjacent frequency sub-bands comprises a second exclusive frequency sub-band that is not comprised in the first plurality of adjacent frequency sub-bands, wherein the first plurality of adjacent frequency sub-bands and the second plurality of adjacent frequency sub-bands comprises at least three common frequency sub-bands, wherein the at least three common frequency sub-bands comprise at least one central common frequency sub-band and two boundary common frequency sub-bands, a first boundary common frequency sub-band of the two boundary common frequency sub-bands is at a lower frequency side of and adjacent to the central common frequency sub-band, and a second boundary common frequency sub-band of the two boundary common frequency sub-bands is at a higher frequency side of and adjacent to the central common frequency sub-band, and wherein in each of the first signal strength profile and the second signal strength profile a respective signal strength of the at least one central common frequency sub-band is smaller than a respective signal strength of each of the two boundary common frequency sub-bands.

13. A wireless receiver, comprising:

a communication interface, configured to receive a first pilot signal and a second pilot signal via a communication channel from a wireless transmitter, wherein the first pilot signal has a first signal strength profile over a first plurality of adjacent frequency sub-bands and the second pilot signal has a second signal strength profile over a second plurality of adjacent frequency sub-bands, wherein the first plurality of adjacent frequency sub-bands comprises a first exclusive frequency sub-band that is not comprised in the second plurality of adjacent frequency sub-bands, wherein the second plurality of adjacent frequency sub-bands comprises a second exclusive frequency sub-band that is not comprised in the first plurality of adjacent frequency sub-bands, wherein the first plurality of adjacent frequency sub-bands and the second plurality of adjacent frequency sub-bands comprise at least three common frequency sub-bands, wherein the at least three common frequency sub-bands comprise at least one central common frequency sub-band and two boundary common frequency sub-bands, a first boundary common frequency sub-band of the two boundary common frequency sub-bands is at a lower frequency side of and adjacent to the central common frequency sub-band, and a second boundary common frequency sub-band of the two boundary common frequency sub-bands is at a higher frequency side of and adjacent to the central common frequency sub-band, and wherein in each of the first signal strength profile and the second signal strength profile a respective signal strength of the at least one central common frequency sub-band is smaller than a respective signal strength of each of the two boundary common frequency sub-bands.

14. The wireless receiver of claim 13, wherein in each of the first signal strength profile and the second signal strength profile a respective signal strength of the first exclusive frequency sub-band or the second exclusive frequency sub-band is larger than a respective signal strength of each of the at least three common frequency sub-bands.

15. The wireless receiver of claim 13, wherein the communication interface is configured to receive the first pilot signal and the second pilot signal simultaneously via the communication channel from the wireless transmitter.

16. The wireless receiver of claim 13, wherein the communication interface is configured to receive the second pilot signal after the first pilot signal via the communication channel from the wireless transmitter.

17. The wireless receiver of claim 13, wherein a respective signal strength of the first pilot signal and a respective signal strength of the second pilot signal are constant within each of the at least three common frequency sub-bands.

18. The wireless receiver of claim 13, wherein the first pilot signal comprises a first signal phase profile over the first plurality of adjacent frequency sub-bands and the second pilot signal comprises a second signal phase profile over the second plurality of adjacent frequency sub-bands.

19. The wireless receiver of claim 13, wherein each of the at least three common frequency sub-bands comprises one or more subcarriers.

20. The wireless receiver of claim 13, wherein the first pilot signal is based on a first code sequence and the second pilot signal is based on a second code sequence.

* * * * *